(12) United States Patent
Shibayama et al.

(10) Patent No.: US 10,895,501 B2
(45) Date of Patent: Jan. 19, 2021

(54) LIGHT-DETECTING DEVICE

(71) Applicant: HAMAMATSU PHOTONICS K.K., Hamamatsu (JP)

(72) Inventors: Katsumi Shibayama, Hamamatsu (JP); Takashi Kasahara, Hamamatsu (JP); Masaki Hirose, Hamamatsu (JP); Toshimitsu Kawai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/662,448

(22) Filed: Oct. 24, 2019

(65) Prior Publication Data

US 2020/0056940 A1 Feb. 20, 2020

Related U.S. Application Data

(63) Continuation of application No. 16/059,744, filed on Aug. 9, 2018, now Pat. No. 10,775,238, which is a
(Continued)

(30) Foreign Application Priority Data

Oct. 31, 2013 (JP) .................................. 2013-227287

(51) Int. Cl.
*G01J 3/26* (2006.01)
*G01J 3/02* (2006.01)

(52) U.S. Cl.
CPC .............. *G01J 3/26* (2013.01); *G01J 3/0286* (2013.01)

(58) Field of Classification Search
CPC ... G01J 3/0286; G01J 3/26; G01J 3/28; G02B 5/284; G02B 26/001
See application file for complete search history.

(56) References Cited

U.S. PATENT DOCUMENTS

| 5,584,117 | A | 12/1996 | Lee et al. |
| 5,629,521 | A | 5/1997 | Lee et al. |

(Continued)

FOREIGN PATENT DOCUMENTS

| EP | 1882917 | 1/2008 |
| JP | H1-136035 | 5/1989 |

(Continued)

OTHER PUBLICATIONS

International Preliminary Report on Patentability dated May 12, 2016 for PCT/JP2014/079106.

(Continued)

*Primary Examiner* — Michael A Lyons
(74) *Attorney, Agent, or Firm* — Faegre Drinker Biddle & Reath LLP

(57) ABSTRACT

A spectral sensor includes a wiring substrate which has a principal surface; a light detector which is disposed on the principal surface of the wiring substrate and is electrically connected to the wiring substrate; spacer which is disposed around the light detector, on the principal surface of the wiring substrate; and a Fabry-Perot interference filter which has a light transmission region and is disposed on the principal surface of the wiring substrate with the spacer therebetween. The spacer support the Fabry-Perot interference filter in a surrounding region of the light transmission region and the spacer is arranged to form opening communicating with an inner side of the surrounding region and an outer side of the surrounding region, when viewed from a light transmission direction in the light transmission region.

4 Claims, 11 Drawing Sheets

Related U.S. Application Data continuation of application No. 15/031,925, filed as application No. PCT/JP2014/079106 on Oct. 31, 2014, now Pat. No. 10,066,995.

(56) References Cited

U.S. PATENT DOCUMENTS

| | | | |
|---|---|---|---|
| 6,907,059 | B1 | 6/2005 | Miura et al. |
| 9,671,286 | B2 | 6/2017 | Kasahara et al. |
| 10,066,995 | B2 | 9/2018 | Shibayama et al. |
| 2003/0132386 | A1* | 7/2003 | Carr ................ G01J 5/046 250/338.1 |
| 2004/0217264 | A1* | 11/2004 | Wood ................ G01J 5/20 250/214 R |
| 2006/0261252 | A1 | 11/2006 | Cole et al. |
| 2009/0040616 | A1 | 2/2009 | Lin et al. |
| 2010/0022840 | A1 | 1/2010 | Yasuda |
| 2010/0296164 | A1 | 11/2010 | Yasuda |
| 2011/0279824 | A1 | 11/2011 | Blomberg et al. |
| 2016/0245697 | A1 | 8/2016 | Shibayama et al. |
| 2016/0357009 | A1 | 12/2016 | Shibayama et al. |
| 2016/0370573 | A1 | 12/2016 | Shibayama et al. |

FOREIGN PATENT DOCUMENTS

| | | |
|---|---|---|
| JP | H05-25290 B2 | 4/1993 |
| JP | H7-092022 A | 4/1995 |
| JP | H07-66982 B2 | 7/1995 |
| JP | H10-90576 A | 4/1998 |
| JP | H10-511772 | 11/1998 |
| JP | 2004-251742 | 9/2004 |
| JP | 2005-510756 A | 4/2005 |
| JP | 2006-114661 | 4/2006 |
| JP | 2006-194791 A | 7/2006 |
| JP | 2008-197361 | 8/2008 |
| JP | 2009-098210 A | 5/2009 |
| JP | 2009-204381 A | 9/2009 |
| JP | 2009-210312 A | 9/2009 |
| JP | 2011-117884 | 6/2011 |
| JP | 2011-227172 | 11/2011 |
| JP | 2012-127917 A | 7/2012 |
| JP | 2012-173347 A | 9/2012 |
| WO | WO 03/046630 A1 | 6/2003 |
| WO | WO 2013/015009 | 1/2013 |

OTHER PUBLICATIONS

Neumann et al., "Tunable infrared detector with integrated micromachined Fabry-Perot filter", Journal of Microlithography, Micofabrication and Microsys, Society of Photo-Optical Instrumentation Engineers, Bellingham, US, vol. 7 No. 2, ISSN: 1537-1646, DOI: 10.1117/1.2909206. Apr. 1, 2008, p. 21004-1, XP007922298.
Neumann et al., "Fig. 10 of Tunable infrared detector with integrated micromachined Fabry-Perot Filter", J. Micro/Nanolith, MEMS MEOMS, Jun. 1, 2008, p. 21004-1, XP055394641.
Antila J., "Miniaturized spectrometer technologies", Information optic(W10), 2010 9th EURO-American Workship on IEEE, Piscataway, NJ, USA, ISBN: 978-1-4244-8226-9, Jul. 12, 2010, p. 1-p. 4, XP031760871.
Martin Ebermann et al., "Design, Operation and Performance of a Fabry-Perot-Based MWIR Microspectrometer," 2009.

* cited by examiner (A)

(B)

(A)

(B)

(A)

(B)

(A)

(B)

(A)

(B)

(A)

(B)

LIGHT-DETECTING DEVICE

TECHNICAL FIELD

The present invention relates to a light-detecting device that includes a Fabry-Perot interference filter.

For example, a light-detecting device according to the related art is described in Patent Literature 1. In the light-detecting device, a light reception element is disposed on a support substrate. In addition, in the light-detecting device, a Fabry-Perot interference filter is disposed on the light reception element with an adhesive layer therebetween. In the light-detecting element, bonding pads for electric connection of the light reception element are disposed on a top surface of the light reception element. The Fabry-Perot interference filter is disposed to be separated from the bonding pads on the top surface of the light reception element, when viewed from a light transmission direction in the Fabry-Perot interference filter.

CITATION LIST

Patent Literature

Patent Literature 1: Japanese Patent Application Laid-Open Publication 2012-173347

SUMMARY OF INVENTION

Technical Problem

However, in the light-detecting element described above, the bonding pads need to be disposed at the outside of the Fabry-Perot interference filter, when viewed from the light transmission direction in the Fabry-Perot interference filter. Therefore, miniaturization of the light-detecting device may be disturbed.

Accordingly, an object of the present invention is to provide a light-detecting device that can be miniaturized.

Solution to Problem

A light-detecting device according to an aspect of the present invention includes a wiring substrate which has a principal surface; a light detector which is disposed on the principal surface of the wiring substrate and is electrically connected to the wiring substrate; a support member which is disposed around the light detector, on the principal surface of the wiring substrate; and a Fabry-Perot interference filter which has a light transmission region and is disposed on the principal surface of the wiring substrate with the support member therebetween. The support member support the Fabry-Perot interference filter in a surrounding region of the light transmission region and the support member has an opening communicating with an inner side of the surrounding region and an outer side of the surrounding region, when viewed from a light transmission direction in the light transmission region.

In the light-detecting device, the opening is provided in the support member. For this reason, even when a bonding pad electrically connected to the light detector is disposed in the surrounding region of the light transmission region, a wiring line to electrically connect the bonding pad and other element can be provided to pass through the opening of the support member. As a result, electric connection with respect to the light detector can be secured. For this reason, the bonding pad does not need to be disposed at the outside of the Fabry-Perot interference filter, when viewed from the light transmission direction in the Fabry-Perot interference filter. Therefore, a size of the light-detecting device can be almost equalized to a size of the Fabry-Perot interference filter. As a result, the light-detecting device can be miniaturized.

Here, the light-detecting device according to the aspect of the present invention may further include a wire connection portion to which one end of a wire electrically connected to the light detector or the Fabry-Perot interference filter is connected and which inputs or outputs an electric signal with respect to the light detector or the Fabry-Perot interference filter and a top surface of the wire connection portion may be disposed at a position lower than a position of a top surface of the Fabry-Perot interference filter. According to this configuration, connection of a wire from the Fabry-Perot interference filter or the light detector to a lead pin is easily performed.

In addition, the top surface of the wire connection portion may be disposed at a position lower than a position of a top surface of the support member. According to this configuration, connection of a wire from the Fabry-Perot interference filter or the light detector to the lead pin is easily performed.

In addition, the wire connection portion may include a first wire connection portion electrically connected to the light detector and a second wire connection portion electrically connected to the Fabry-Perot interference filter and a first direction in which a distance between the first wire connection portion and the Fabry-Perot interference filter becomes shortest may cross a second direction in which a distance between the second wire connection portion and the Fabry-Perot interference filter becomes shortest. According to this configuration, an arrangement of the wire can be prevented from being complicated and workability of wire bonding can be improved.

Here, in the light-detecting device according to the aspect of the present invention, at least a part of the bonding pad electrically connected to the light detector may be disposed in the surrounding region. According to this configuration, the wiring line to electrically connect the bonding pad and other element can be provided to pass through the opening of the support member. As a result, electric connection with respect to the light detector can be secured. For this reason, a space to dispose the bonding pad is not necessary as compared with the case in which the bonding pad is disposed at the outside of a region surrounded by the support member. Therefore, the light-detecting device can be miniaturized.

In addition, in the light-detecting device according to the aspect of the present invention, the Fabry-Perot interference filter may have a bonding pad and the support member may be disposed at a position corresponding to the bonding pads of the Fabry-Perot interference filter, when viewed from the transmission direction. According to this configuration, in a wire bonding process at the time of manufacturing the light-detecting device, the bonding pad of the Fabry-Perot interference filter are supported by the support member provided at the position corresponding to the bonding pad. Therefore, wire bonding performance can be improved.

In addition, in the light-detecting device according to the aspect of the present invention, the support member may be separated from the light transmission region of the Fabry-Perot interference filter, when viewed from the transmission direction. According to this configuration, because the support member and the light transmission region are separated from each other, in manufacturing the light-detecting device, even when a material such as a resin used for the adhesive portion protrudes from the adhesive portion, the material such as the resin can be suppressed from entering the light transmission region.

Advantageous Effects of Invention

According to the present invention, a light-detecting device that can be miniaturized can be provided.

DESCRIPTION OF EMBODIMENTS

Figure 1:
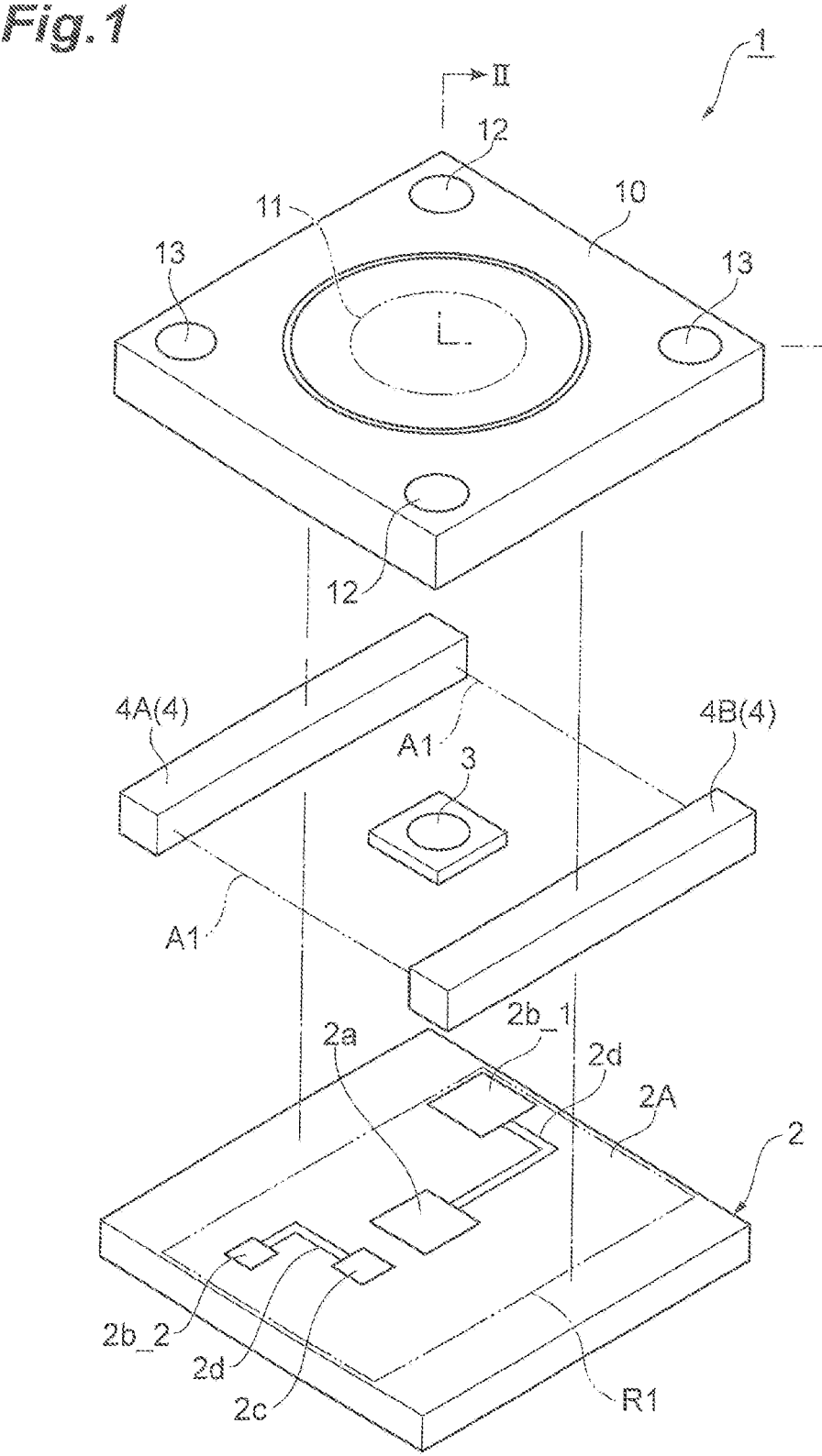
FIG. 1 is an exploded perspective view of a light-detecting device according to an embodiment.

Hereinafter, preferred embodiments of the present invention will be described in detail with reference to the drawings. In the individual drawings, the same or equivalent portions are denoted with the same reference numerals and overlapped portions are omitted.

First Embodiment

[Spectral Sensor]

As illustrated in FIG. 1, a spectral sensor (light-detecting device) 1 includes a wiring substrate 2, a light detector 3, a plurality of spacers (support members) 4, and a Fabry-Perot interference filter 10. The wiring substrate 2 has a principal surface 2A. A mounting unit 2a, a plurality of electrode pads (bonding pads) 2b, and a mounting unit 2c are provided on the principal surface 2A of the wiring substrate 2. The light detector 3 is mounted on the mounting unit 2a. A temperature compensation element such as a thermistor is mounted on the mounting unit 2c. An electrode pad 2b_1 is electrically connected to the mounting unit 2a by a wiring line 2d. An electrode pad 2b_2 (electrode pad 2b_2 not electrically connected to the mounting unit 2a) is electrically connected to the mounting unit 2c by the wiring line 2d. In addition, the electrode pad 2b_2 (electrode pad 2b_2 not electrically connected to the mounting unit 2a) electrically connects the thermistor mounted on the mounting unit 2c to the outside of the spectral sensor 1. The light detector 3 is an infrared detector, for example. As the infrared detector, a quantum-type sensor using InGaAs or a thermal sensor using a thermopile or a bolometer can be used. When each of an ultraviolet (UV) region, a visible region, and a near-infrared region is detected, a silicon photodiode can be used as the light detector 3.

The plurality of spacers 4 are fixed on the principal surface 2A of the wiring substrate 2. The Fabry-Perot interference filter 10 is fixed on the plurality of spacers 4. In this way, the plurality of spacers 4 support the Fabry-Perot interference filter 10. In addition, the Fabry-Perot interference filter 10 is disposed on the principal surface 2A of the wiring substrate 2. At this time, to suppress an influence of thermal strain on the Fabry-Perot interference filter 10, the plurality of spacers 4 and the Fabry-Perot interference filter 10 are preferably fixed by an adhesive portion. The adhesive portion is made of a flexible resin material. As the resin material configuring the adhesive portion, various resin materials such as silicone resins, urethane resins, epoxy resins, acrylic resins, and hybrid resins can be used. Preferably, a material of which elastic modulus (or Young's modulus) is equal to or smaller than 0.1 GPa is used as the resin material. In addition, the resin material is preferably selected from room temperature curing resin materials or low temperature curing resin materials.

Here, in the die bond resin 5 functioning as an adhesive agent to adhere the spacers 4 and the Fabry-Perot interference filter 10 to each other, hardness after hardening is smaller than hardness of an adhesive agent to adhere the spacers 4 and the wiring substrate 2 to each other. For example, the spacers 4 and the Fabry-Perot interference filter 10 are preferably fixed by an adhesive agent made of a silicon resin material of which elastic modulus after hardening is smaller than 10 MPa. In addition, the spacers 4 and the wiring substrate 2 are preferably fixed by an adhesive agent made of an epoxy resin material of which elastic modulus after hardening is equal to or larger than 100 MPa. As a result, the spacers 4 and the wiring substrate 2 can be fixed firmly and the thermal strain from a peripheral member of the Fabry-Perot interference filter 10 can be suppressed from being transmitted to the Fabry-Perot interference filter 10 via the adhesive agent.

In addition, silicon, ceramic, quartz, glass, and plastic can be used as examples of a material of the plurality of spacers 4. Particularly, to alleviate a difference of thermal expansion coefficients with portions contacting the plurality of spacers 4 in the Fabry-Perot interference filter 10, the material of the plurality of spacers 4 is preferably a material of which a thermal expansion coefficient is equal to or smaller than a thermal expansion coefficient of the material of the Fabry-Perot interference filter 10. For example, when the Fabry-Perot interference filter 10 is formed on a silicon substrate, the plurality of spacers 4 are preferably formed of a material having a small thermal expansion coefficient, such as the quartz and the silicon. In addition, instead of a configuration in which the wiring substrate 2 and the spacers 4 are formed separately as described above, a configuration in which portions becoming the spacers 4 are formed integrally on a surface of the wiring substrate 2 may be used. The light detector 3 faces a light transmission region 11 of the Fabry-Perot interference filter 10 between the wiring substrate 2 and the Fabry-Perot interference filter 10. In addition, the light detector 3 detects light having transmitted the Fabry-Perot interference filter 10. In addition, a temperature sensor such as the thermistor may be disposed on the wiring substrate 2.

As described below, the wiring substrate 2, the light detector 3, the plurality of spacers 4, and the Fabry-Perot interference filter 10 are accommodated in a CAN package. In an accommodation state, the wiring substrate 2 is fixed on a stem and the light transmission region 11 of the Fabry-Perot interference filter 10 faces a light transmission window of a cap. The electrode pads 2b of the wiring substrate 2 are electrically connected to individual lead pins 84 penetrating the stem by wire bonding. In addition, terminals 12 and 13 of the Fabry-Perot interference filter 10 are electrically connected to the individual lead pins penetrating the stem by the wire bonding. An input/output of an electric signal with respect to the light detector 3 is executed via the lead pins, the electrode pads 2b, and the mounting unit 2a. A voltage is applied to the Fabry-Perot interference filter 10 via the lead pins and the terminals 12 and 13.

Figure 4:
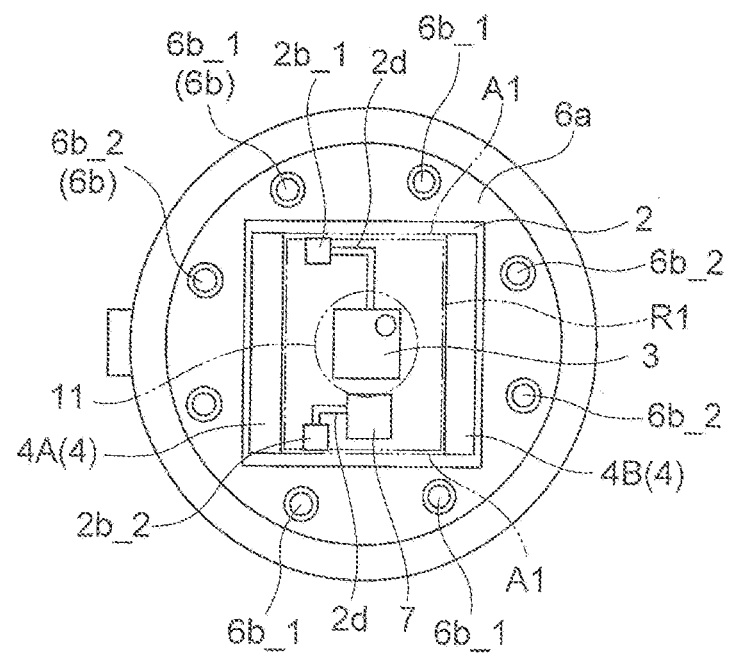
FIG. 4 is a plan view illustrating a process for manufacturing the light-detecting device, following FIG. 3.
Figure 4:
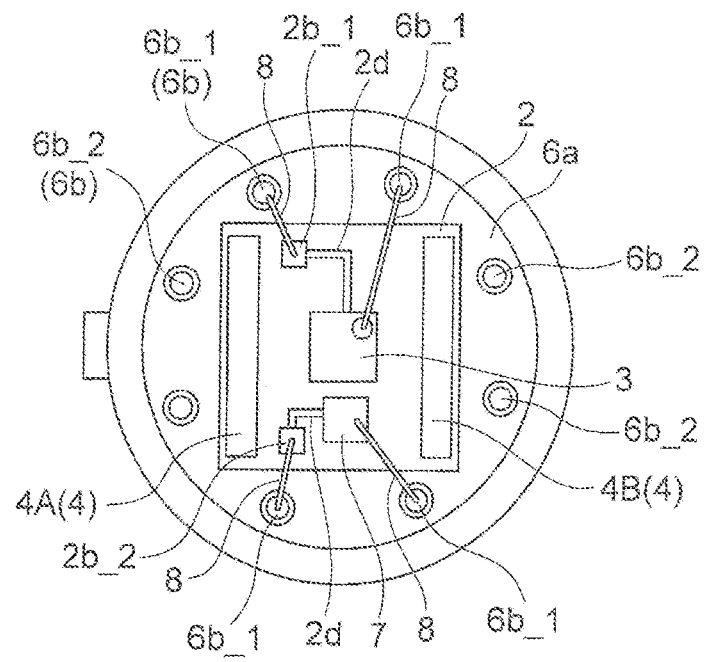

Hereinafter, an arrangement of the spacers 4 will be described. The spacers 4 are disposed to have an opening communicating with an inner side and an outer side of a surrounding region (region that does not include the light transmission region 11 and surrounds the light transmission region 11) of the light transmission region 11, when viewed from a light transmission direction in the light transmission region 11 of the Fabry-Perot interference filter 10. In the present specification, if a certain element (for example, the spacers 4) has an opening, it means that the element has a break in at least one place. In other words, the element does not have an annular shape to surround a certain region (for example, the light transmission region 11) without a gap. A relation of lengths of the element and the opening is not limited in particular. For example, if the spacers 4 are provided in some portion on the circumference of a figure such as a circle and a polygon surrounding the light transmission region 11 and the spacers 4 are not provided in an entire portion (if there is a portion in which the spacers 4 are not provided), the spacers 4 have the opening. To dispose the Fabry-Perot interference filter 10 stably, the spacers 4 are preferably disposed on at least both sides of the light transmission region 11, when viewed from the light transmission direction. As a specific example of the spacers 4 having the opening, the two spacers 4 extending linearly may be disposed in parallel to each other (refer to FIG. 4(A)). As another specific example, the columnar spacers 4 may be disposed at four vertexes of a rectangle, respectively (refer to FIG. 9). As another specific example, the spacer 4 may be disposed in a shape of U (refer to FIG. 10(A)).

In the spectral sensor 1 according to this embodiment, two linear spacers 4A and 4B disposed in parallel to each other are used as the spacers 4. The spacers 4A and 4B have the openings A1 shown by a two-dotted chain line between ends of the same sides in the spacers 4A and 4B. In other words, a rectangle to surround the light transmission region 11 is formed by the spacers 4A and 4B and the two openings A1 and A1. The spacers 4A and 4B are provided at two sides of the rectangle, respectively. In addition, the spacers 4A and 4B are not provided at the remaining two sides. The openings A1 and A1 are formed at the remaining two sides.

In addition, in the spectral sensor 1, the electrode pad 2b connected to the mounting unit 2a is disposed in a surrounding region R1 of the light transmission region 11, on the principal surface 2A of the wiring substrate 2. The entire electrode pads 2b may be disposed in the surrounding region R1. In addition, only a part of the electrode pads 2b may be disposed in the surrounding region R1.

In the spectral sensor 1 configured as described above, if measurement light is incident, light having a predetermined wavelength according to a voltage applied to the Fabry-Perot interference filter 10 transmits the Fabry-Perot interference filter 10. In addition, the light having transmitted the Fabry-Perot interference filter 10 is detected by the light detector 3. In the spectral sensor 1, the light having transmitted the Fabry-Perot interference filter 10 is detected by the light detector 3 while the voltage applied to the Fabry-Perot interference filter 10 is changed, so that a spectral spectrum can be obtained.

[Fabry-Perot Interference Filter]

Figure 2:
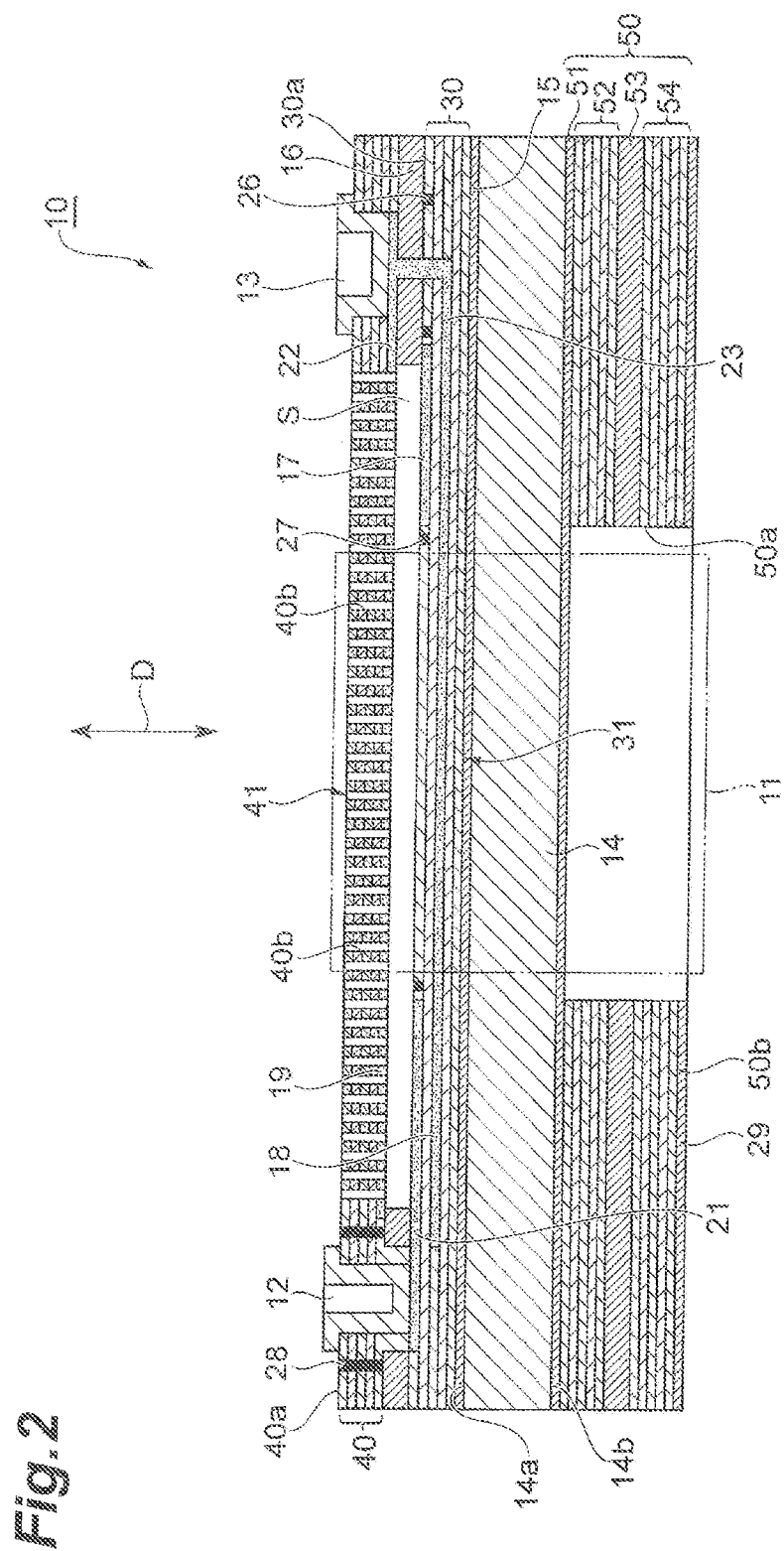
FIG. 2 is a cross-sectional view of a Fabry-Perot interference filter.

As illustrated in FIG. 2, the Fabry-Perot interference filter 10 includes a substrate 14. A reflection prevention layer 15, a first laminate 30, a sacrificial layer 16, and a second laminate 40 are sequentially stacked on a surface 14a of a light incidence side of the substrate 14. A gap (air gap) S is formed between the first laminate 30 and the second laminate 40 by the sacrificial layer 16 of a frame shape. In the Fabry-Perot interference filter 10, the measurement light is incident on the second laminate 40 from the side opposite to the substrate 14. In addition, light having a predetermined wavelength transmits the light transmission region 11 defined in a center portion of the Fabry-Perot interference filter 10. In addition, the substrate 14 is made of silicon, quartz, and glass, for example. When the substrate 14 is made of the silicon, the reflection prevention layer 15 and the sacrificial layer 16 are made of silicon oxide, for example. A thickness of the sacrificial layer 16 is 200 nm to 10 μm. The thickness of the sacrificial layer 16 is preferably the integral multiple of ½ of a center transmission wavelength (that is, a wavelength to be a center of a variable range of a transmission wavelength of the Fabry-Perot interference filter 10).

A portion corresponding to the light transmission region 11 in the first laminate 30 functions as a first mirror 31. The first laminate 30 is configured by laminating a plurality of polysilicon layers and a plurality of silicon nitride layers alternately. An optical thickness of each of the polysilicon layer and the silicon nitride layer configuring the first mirror 31 is preferably the integral multiple of ¼ of the center transmission wavelength (center wavelength of the variable wavelength range).

A portion corresponding to the light transmission region 11 in the second laminate 40 functions as the second mirror 41. The second mirror 41 faces the first mirror 31 with the gap S therebetween. Similar to the first laminate 30, the second laminate 40 is configured by laminating a plurality of polysilicon layers and a plurality of silicon nitride layers alternately. An optical thickness of each of the polysilicon layer and the silicon nitride layer configuring the second mirror 41 is preferably the integral multiple of ¼ of the center transmission wavelength (center wavelength of the variable wavelength range).

In addition, a plurality of through-holes 40b are distributed uniformly in a portion corresponding to the gap S in the second laminate 40. The through-holes 40b extend from the surface 40a of the second laminate 40 to the gap S. The through-holes 40b are formed not to substantially affect a function of the second mirror 41. A diameter of the through-hole 40b is 100 nm to 5 μm, for example. In addition, an opening area of the through-holes 40b occupies 0.01% to 10% of an area of the second mirror 41.

In the Fabry-Perot interference filter 10, the first mirror 31 and the second mirror 41 are supported to the substrate 14. In addition, the first mirror 31 is disposed on a light incidence side of the substrate 14. The second mirror 41 is disposed on a light incidence side of the first mirror 31 with the gap S therebetween.

In the first mirror 31, a first electrode 17 is formed to surround the light transmission region 11. The first electrode 17 is formed by doping impurities into the polysilicon layer and decreasing resistance.

In the first mirror 31, a second electrode 18 is formed to include the light transmission region 11. The second electrode 18 is formed by doping the impurities into the polysilicon layer and decreasing resistance. In the polysilicon layer, a size of the second electrode 18 is preferably a size including an entire region of the light transmission region 11. In addition, a size of the second electrode 18 may be almost equal to a size of the light transmission region 11.

In the second mirror 41, a third electrode 19 is formed. The third electrode 19 faces the first electrode 17 and the second electrode 18. The third electrode 19 is formed by doping the impurities into the polysilicon layer and decreasing resistance.

In the Fabry-Perot interference filter 10, the second electrode 18 is positioned at the side opposite to the third electrode 19 with respect to the first electrode 17, in a facing direction D in which the first mirror 31 and the second mirror 41 face each other. That is, the first electrode 17 and the second electrode 18 are not disposed on the same plane in the first mirror 31. The second electrode 18 is separated from the third electrode 19 more than the first electrode 17.

As illustrated in FIGS. 1 and 2, the terminals 12 apply a voltage to the Fabry-Perot interference filter 10. The pair of terminals 12 is provided to face each other with the light transmission region 11 therebetween. Each terminal 12 is disposed in the through-hole extending from the surface 40a of the second laminate 40 to the first laminate 30. Each terminal 12 is electrically connected to the first electrode 17 via a wiring line 21.

As illustrated in FIGS. 1 and 2, the terminals 13 apply a voltage to the Fabry-Perot interference filter 10. The pair of terminals 13 is provided to face each other with the light transmission region 11 therebetween. A facing direction of the pair of terminals 12 and a facing direction of the pair of terminals 13 are orthogonal to each other. Each terminal 13 is electrically connected to the third electrode 19 via a wiring line 22. In addition, the third electrode 19 is electrically connected to the second electrode 18 via a wiring line 23.

As illustrated in FIG. 2, trenches 26 and 27 are provided are provided in a surface 30a of the first laminate 30. The trench 26 extends annularly to surround the wiring line 23 extending along the facing direction D from the terminal 13. The trench 26 electrically insulates the first electrode 17 and the wiring line 23 from each other. The trench 27 extends annularly along an inner edge of the first electrode 17. The trench 27 electrically insulates the first electrode 17 and an inner region of the first electrode 17 from each other. A region in each of the trenches 26 and 27 may be an insulating material and may be a gap.

A trench 28 is provided in the surface 40a of the second laminate 40. The trench 28 extends annularly to surround the terminal 12. A bottom surface of the trench 28 reaches the sacrificial layer 16. The trench 28 electrically insulates the terminal 12 and the third electrode 19 from each other. A region in the trench 28 may be an insulating material and may be a gap.

A reflection prevention layer 51, a third laminate 52, an intermediate layer 53, and a fourth laminate 54 are sequentially stacked on a surface 14b of a light emission side of the substrate 14. The reflection prevention layer 51 and the intermediate layer 53 have the same configurations as the configurations of the reflection prevention layer 15 and the sacrificial layer 16, respectively. The third laminate 52 and the fourth laminate 54 have lamination structures symmetrical to lamination structures of the first laminate 30 and the second laminate 40, on the basis of the substrate 14. A stress adjustment layer 50 is configured by the reflection prevention layer 51, the third laminate 52, the intermediate layer 53, and the fourth laminate 54. The stress adjustment layer 50 is disposed on the light emission side of the substrate 14 and has a function of suppressing a warp of the substrate 14. An opening 50a is provided in the stress adjustment layer 50 to include the light transmission region 11. A light shielding layer 29 is formed on a surface 50b of the light emission side of the stress adjustment layer 50. The light shielding layer 29 is made of aluminum and has a function of shielding measurement light.

In the Fabry-Perot interference filter 10 configured as described above, if a voltage is applied between the first electrode 17 and the third electrode 19 through the terminals 12 and 13, electrostatic force according to the voltage is generated between the first electrode 17 and the third electrode 19. By the electrostatic force, the second mirror 41 is driven to be attracted to the side of the first mirror 31 fixed on the substrate 14. By the drive, the distance between the first mirror 31 and the second mirror 41 is adjusted. The wavelength of the light transmitting the Fabry-Perot interference filter 10 depends on the distance between the first mirror 31 and the second mirror 41 in the light transmission region 11. Therefore, the wavelength of the transmitting light can be appropriately selected by adjusting the voltage applied between the first electrode 17 and the third electrode 19. At this time, the second electrode 18 has the same potential as the potential of the third electrode 19 electrically connected to the second electrode 18. Therefore, the second electrode 18 functions as a compensation electrode to maintain the first mirror 31 and the second mirror 41 in the light transmission region 11 evenly.

[Process for Manufacturing Spectral Sensor]

Figure 3:
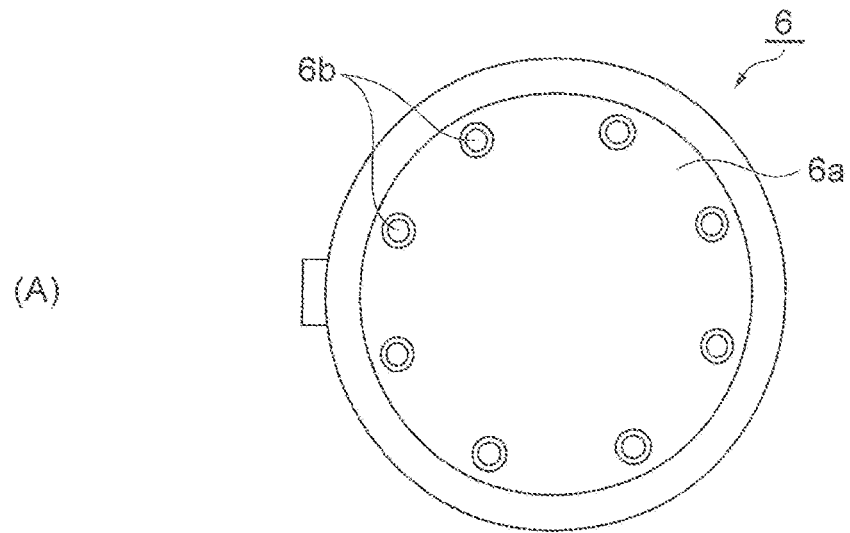
FIG. 3 is a plan view illustrating a process for manufacturing the light-detecting device.
Figure 3:
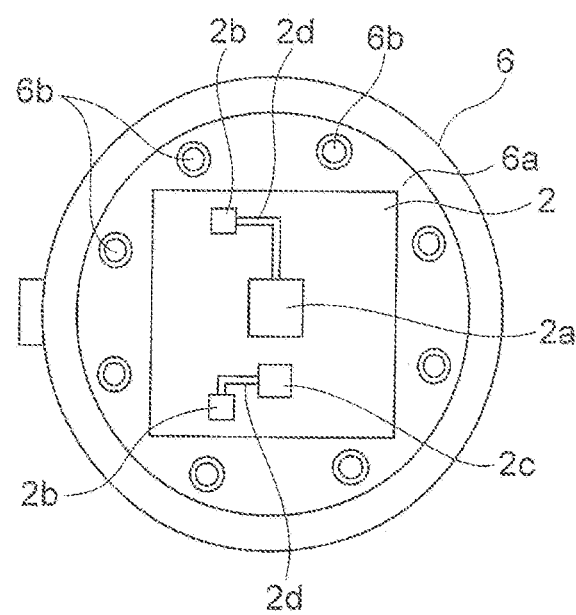
Figure 6:
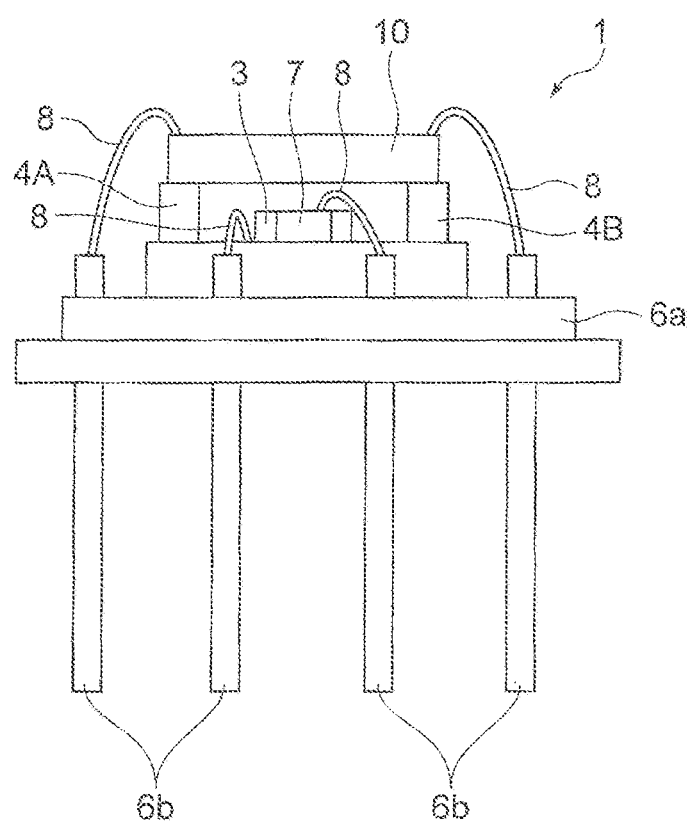
FIG. 6 is a lateral view corresponding to FIG. 5(B).
Figure 7:
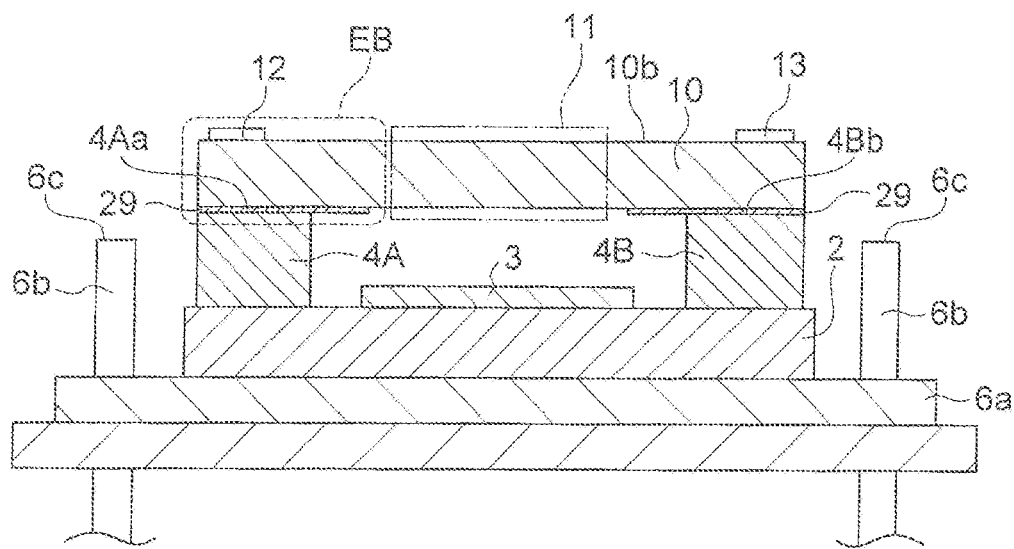
FIG. 7 is a cross-sectional view taken along line VII-VII of FIG. 5(B) and an enlarged view of a part thereof.
Figure 7:
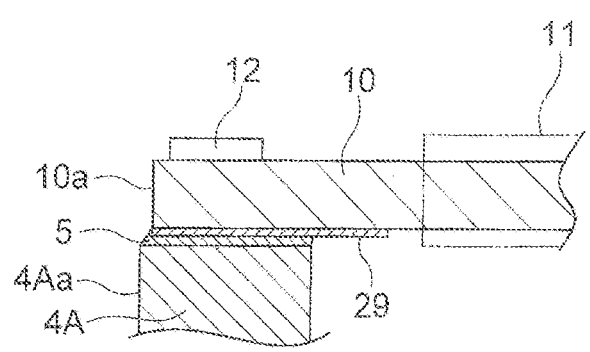

Next, processes for manufacturing the spectral sensor according to this embodiment will be described with reference to FIGS. 3 to 8. FIGS. 3 to 5 and 8 are plan views illustrating the manufacturing processes. FIG. 6 is a lateral view corresponding to FIG. 5(B). FIG. 7 is a cross-sectional view taken along line VII-VII of FIG. 5(B) and an enlarged view of a part thereof. As illustrated in FIG. 3(A), first, a stem 6 is prepared. The stem 6 is a TO-CAN stem, for example. The stem 6 has a configuration in which conductive lead pins 6b penetrate a disk-shaped base 6a.

Figure 11:
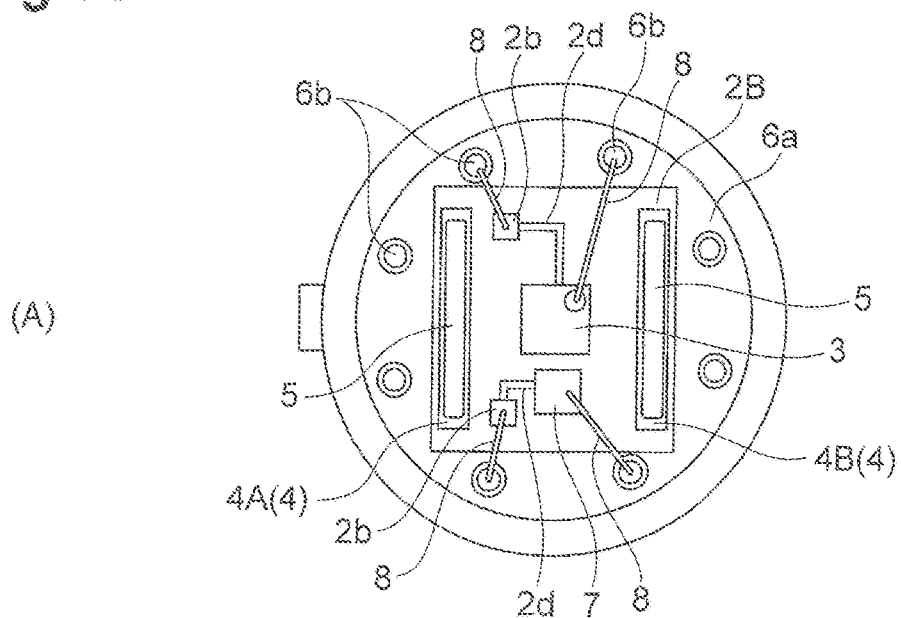
FIG. 11 is a plan view illustrating a modification of a light-detecting device according to a first embodiment.
Figure 11:
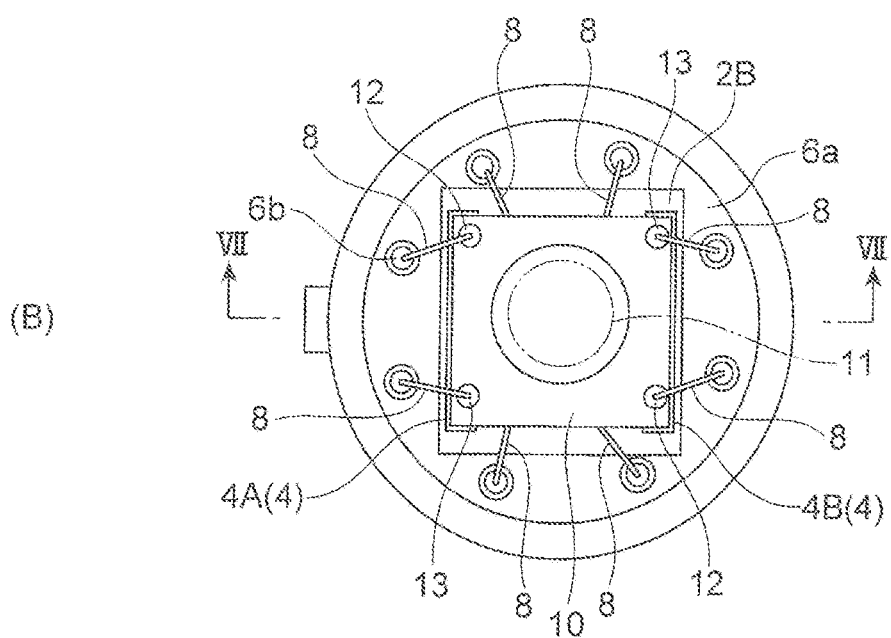

Next, as illustrated in FIG. 3(B), the wiring substrate 2 is disposed on the base 6a of the stem 6. In addition, the wiring substrate 2 is adhered to the base 6a by a resin. The mounting unit 2a, the plurality of electrode pads 2b (bonding pads), and the mounting unit 2c are disposed on the wiring substrate 2. The mounting unit 2a is used to fix the light detector 3. The mounting unit 2c is used to arrange a thermistor 7. The mounting units 2a and 2c are electrically connected to the different electrode pads 2b by the wiring lines 2d. In FIG. 3(B), the wiring substrate 2 is described as having a plane shape of a square. However, the present invention is not limited thereto. For example, as illustrated in FIG. 11, the wiring substrate 2B may have a plane shape of a rectangle long in a direction in which a distance between the lead pin 6b connected to the light detector 3 and the Fabry-Perot interference filter 10 is shortest. According to this configuration, electric connection of the lead pin 6b and an element such as the light detector 3 disposed on a top surface of the wiring substrate 2 becomes easy.

Next, as illustrated in FIG. 4(A), the light detector 3 is disposed on the mounting unit 2a of the wiring substrate 2. In addition, the thermistor 1 is disposed on the mounting unit 2c of the wiring substrate 2. In addition, the spacers 4A and 4B to be two rod-shaped members are disposed on the wiring substrate 2 to extend in parallel to each other. The spacers 4 are provided to have the two openings A1 and A1, when viewed from a light transmission direction (direction perpendicular to a plane of paper) in the light transmission region 11 of the Fabry-Perot interference filter 10. The openings A1 and A1 communicate with the inner side and the outer side of the surrounding region R1 of the light transmission region 11. The electrode pad 2b electrically connected to the mounting unit 2a on which the light detector 3 is mounted is disposed in the surrounding region R1 of the light transmission region 11, on the principal surface 2A of the wiring substrate 2.

The two spacers 4A and 4B are disposed in a surrounding region of the light transmission region 11, when viewed from the light transmission direction in the light transmission region 11 of the Fabry-Perot interference filter 10. That is, the spacers 4A and 4B are disposed to be separated from the light transmission region 11, when viewed from the light transmission direction in the light transmission region 11. In addition, the thermistor 7 may be omitted.

Next, as illustrated in FIG. 4(B), the light detector 3, the thermistor 7, the electrode pads 2b_1 and 2b_2, and the lead pin 6b_1 (first wire connection portion) of the stem 6 are electrically connected by wire bonding using the wire 8. A material of the wire 8 is gold (Au), for example.

Here, the electrode pad 2b electrically connected to the light detector 3 is disposed in the surrounding region R1 of the light transmission region 11, on the principal surface 2A of the wiring substrate 2. In addition, the wire 8 connected to die electrode pad 2b electrically connected to the light detector 3 is connected to the lead pin 6b of the stem 6 via the opening A1 formed between the spacers 4A and 4B. In addition, the light detector 3 disposed on the top surface of the wiring substrate 2 and the wire 8 connected to the thermistor 7 are connected to the lead pin 6b_1 of the stem 6 via the opening A1 formed between the spacers 4A and 4B.

Next, as illustrated in FIG. 5(A), the die bond resin 5 (adhesive portion) is applied to the spacers 4. Here, the die bond resin 5 is provided to have an opening communicating with the inner side and the outer side of the surrounding region of the light transmission region 11, when viewed from the light transmission direction in the light transmission region 11. Here, if the die bond resin 5 has the opening, it means that a shape of the die bond resin 5 does not become an annular shape in which there is no break and the shape of the die bond resin 5 includes the same shape as the shape previously exemplified for the spacers 4. Specifically, the die bond resin 5 is applied to only both sides of the Fabry-Perot interference filter 10, when viewed from the light transmission direction in the light transmission region 11 of the Fabry-Perot interference filter 10. In the case of the example illustrated in FIG. 5(A), the die bond resin 5 is applied over almost the entire length of the top surfaces of the spacers 4A and 4B.

Next, as illustrated in FIG. 5(B), the Fabry-Perot interference filter 10 is disposed on the spacers 4. As a result, the Fabry-Perot interference filter 10 is fixed on the spacers 4 by the die bond resin 5 (the Fabry-Perot interference filter 10 is disposed on the light detector 3 to be separated from each other). At this time, the spacers 4 are disposed at the positions corresponding to the terminals 12 and 13. The terminals 12 and 13 function as the bonding pads of the Fabry-Perot interference filter 10. In addition, the terminals 12 and 13 of the Fabry-Perot interference filter 10 are electrically connected to the lead pin 6b_2 (second wire connection portion) of the stem 6 by the wire 8. A material of the wire 8 is gold (Au), for example.

Here, a connection direction of the Fabry-Perot interference filter 10 and the lead pin 6b_2 (second direction in which a distance between the lead pin 6b_2 connected to the Fabry-Perot interference filter 10 and the Fabry-Perot interference filter 10 becomes shortest) and a connection direction of the light detector 3 and the lead pin 6b_1 (first direction in which a distance between the lead pin 6b connected to the light detector 3 and the Fabry-Perot interference filter 10 becomes shortest) cross each other. According to this configuration, the arrangement of the wire 8 can be prevented from being complicated and workability of the wire bonding can be improved.

A lateral view corresponding to FIG. 5(B) is illustrated in FIG. 6. The Fabry-Perot interference filter 10 and the spacers 4A and 4B are adhered by the die bond resin 5.

Figure 5:
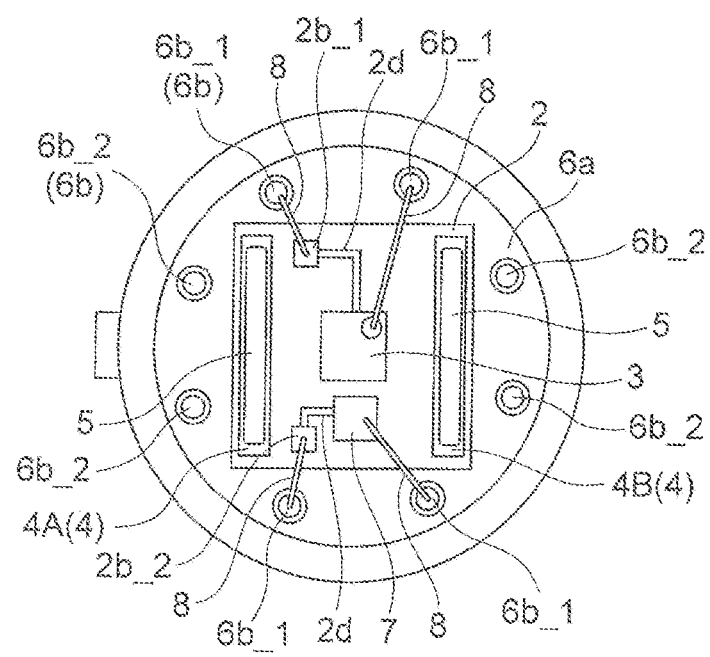
FIG. 5 is a plan view illustrating a process for manufacturing the light-detecting device, following FIG. 4.
Figure 5:
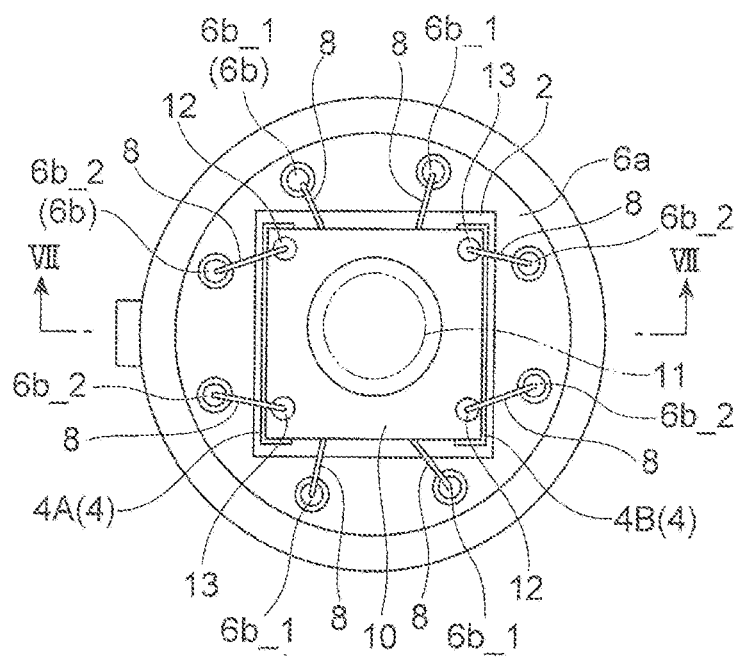

The cross-sectional view taken along line VII-VII of FIG. 5 is illustrated in FIG. 7(A). An enlarged view corresponding to a portion surrounded by an ellipse EB in FIG. 7(A) is illustrated in FIG. 7(B).

The spacers 4A and 4B are separated from the light transmission region 11 of the Fabry-Perot interference filter 10. In addition, the spacers 4A and 4B are disposed at the positions corresponding to the terminals 12 and 13 of the Fabry-Perot interference filter 10. Specifically, the spacers 4A and 4B are positioned right below the terminals 12 and 13. The Fabry-Perot interference filter 10 is adhered to the top surfaces of the spacers 4A and 4B, such that the top surfaces of the spacers 4A and 4B and the light shielding layer 29 of the Fabry-Perot interference filter 10 contact each other. In addition, as illustrated in FIG. 7(B), an outside surface 4Aa of the spacer 4A is positioned to be slightly closer to the outside than an outside surface 10a of the Fabry-Perot interference filter 10. In one embodiment, as illustrated in FIG. 7(A), a thickness of the wiring substrate 2 along the light transmission direction is 0.3 mm, a height of the spacer 4B is 0.4 mm, and a thickness of the Fabry-Perot interference filter 10 is 0.6 mm. In addition, a height of a portion where the lead pin 6b protrudes from the top surface of the base 6a is 0.5 mm. That is, a top surface 6c of the lead pin 6b is positioned lower than a top surface 10b of the Fabry-Perot interference filter 10. In addition, the top surface 6c of the lead pin 6b is positioned lower than top surfaces 4Ab and 4Bb of the spacers 4A and 4B. As a result, connection of the wire from the Fabry-Perot interference filter 10 or the light detector 3 to the lead pin 6b is easily performed.

Figure 8:
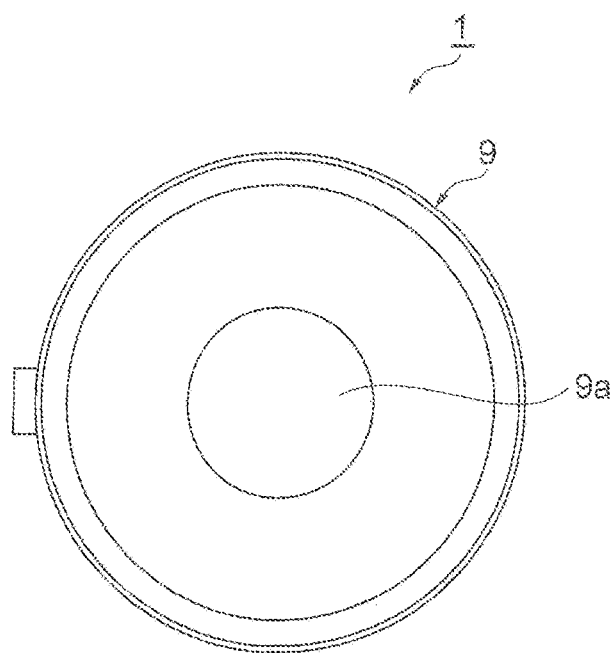
FIG. 8 is a plan view illustrating a process for manufacturing the light-detecting device, following FIG. 5.

A process following FIG. 5(B) is illustrated in FIG. 8. As illustrated in FIG. 8, a cap 9 made of a metal is mounted on the base 6a of the stem 6. By mounting the cap 9, the Fabry-Perot interference filter 10 and the light detector 3 are sealed. The cap 9 is formed to be approximately cylindrical and includes a circular transmission window 9a provided on a top surface thereof. The transmission window 9a may be a transmission window using a material corresponding to an application wavelength range of the spectral sensor 1. As the material, glass, silicon, and germanium are exemplified. In addition, the transmission window 9a may be a window to which a reflection prevention film is attached or a band-pass filter to restrict the application wavelength range. The spectral sensor 1 is obtained by the manufacturing processes described with reference to FIGS. 3 to 8.

In the spectral sensor 1 according to this embodiment, the openings A1 and A1 communicating with the inner side and the outer side of the surrounding region R1 of the light transmission region 11 are provided in the spacers 4A and 4B. For this reason, even when the electrode pad 2b electrically connected to the light detector 3 is disposed at the inner side of the region surrounded by the spacers 4A and 4B of the surrounding region of the light transmission region 11, the wire 8 to electrically connect the electrode pad 2b and other element can be provided to pass through the openings A1 of the spacers 4A and 4B. As a result, electric connection with respect to the light detector 3 can be secured. For this reason, the electrode pad 2b electrically connected to the light detector 3 does not need to be disposed at the outside of the Fabry-Perot interference filter 10, when viewed from the light transmission direction in the Fabry-Perot interference filter 10. Therefore, the size of the spectral sensor 1 can be almost equalized to the size of the Fabry-Perot interference filter 10. As a result, the spectral sensor 1 can be miniaturized.

In addition, the spacers 4A and 4B have the openings A1 and A1. For this reason, a sealed space is not formed by the Fabry-Perot interference filter 10, the spacers 4, and the die bond resin 5. Therefore, at the time of thermal hardening of the die bond resin 5 in manufacturing the spectral sensor 1, a situation in which air in a space surrounded by the Fabry-Perot interference filter 10, the spacers 4, and the die bond resin 5 thermally expands and breaks the die bond resin 5 does not occur. As a result, a situation in which misalignment of the Fabry-Perot interference filter 10 occurs and an optical characteristic is deteriorated can be suppressed from occurring. In addition, when an element having a membrane structure such as a thermopile is used as the light detector 3, the membrane structure of the light detector 3 can be prevented from being damaged by the thermal expansion of the air.

In addition, the electrode pad 2b electrically connected to the light detector 3 is disposed at the inner side of the region surrounded by the spacers 4A and 4B in the surrounding region R1 of the light transmission region 11. For this reason, the wiring line to electrically connect the electrode pad 2b and other element can be provided to pass through the openings A1 of the spacers 4A and 4B. As a result, the electric connection with respect to the light detector 3 can be secured. For this reason, the space to dispose the electrode pad 2b is not necessary as compared with the case in which the electrode pad 2b is disposed at the outside of the region surrounded by the spacers 4A and 4B. Therefore, the spectral sensor 1 can be miniaturized.

In addition, the Fabry-Perot interference filter 10 has the terminals 12 and 13. The spacers 4A and 4B are disposed at the positions corresponding to the terminals 12 and 13 of the Fabry-Perot interference filter 10, when viewed from the light transmission direction in the Fabry-Perot interference filter 10. For this reason, in a wire bonding process at the time of manufacturing the spectral sensor 1, the terminals 12 and 13 of the Fabry-Perot interference filter 10 are supported by the spacers 4A and 4B provided at the positions corresponding to the terminals 12 and 13. Therefore, wire bonding performance can be improved.

In addition, the Fabry-Perot interference filter 10 has the light transmission region 11. The spacers 4A and 4B are separated from the light transmission region 11 of the Fabry-Perot interference filter 10, when viewed from the light transmission direction in the Fabry-Perot interference filter 10. Therefore, the spacers 4A and 4B and the light transmission region 11 are separated from each other. For this reason, in manufacturing the spectral sensor 1, even when the die bond resin 5 protrudes, the die bond resin 5 can be suppressed from entering the light transmission region 11. Even when the die bond resin 5 is excessively applied, the surplus die bond resin 5 is moved to the lower sides of the spacers 4A and 4B. As a result, the die bond resin 5 can be prevented from being moved to the light transmission region 11.

In addition, as illustrated in FIG. 7(B), the outside surface of the spacer 4A is positioned to be slightly closer to the outside than the outside surface of the Fabry-Perot interference filter 10. Therefore, because a fillet of the die bond resin 5 is formed, the adhesion is surely performed.

[Modification]

Figure 9:
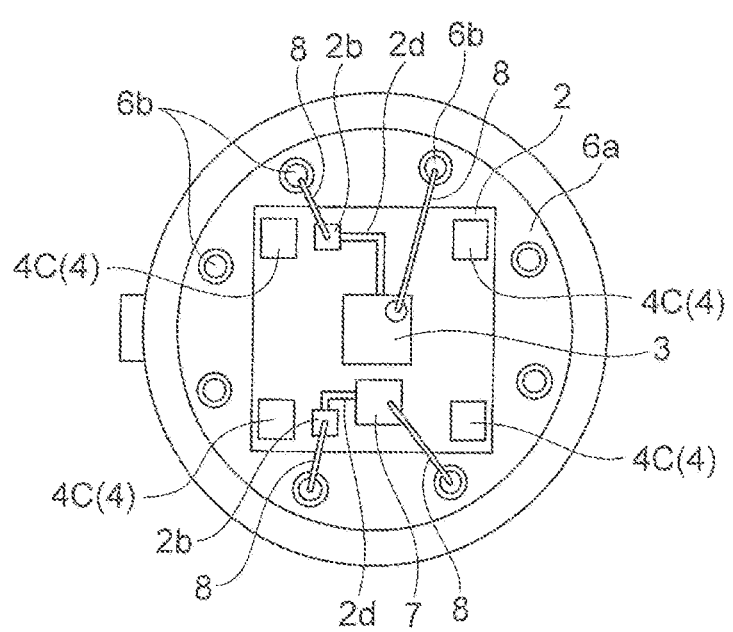
FIG. 9 is a plan view illustrating a modification of the light-detecting device.

For the arrangement of the spacers 4 described with reference to FIG. 4(B) and the arrangement of the die bond resin 5 described with reference to FIG. 5(A), various modifications can be taken. For example, as illustrated in FIG. 9, the columnar spacers 4C are disposed in the vicinity of the four vertexes of the wiring substrate 2 of the rectangular shape. In addition, the die bond resins 5 may be applied in a dotted shape to the top surfaces of the four spacers 4C.

Figure 10:
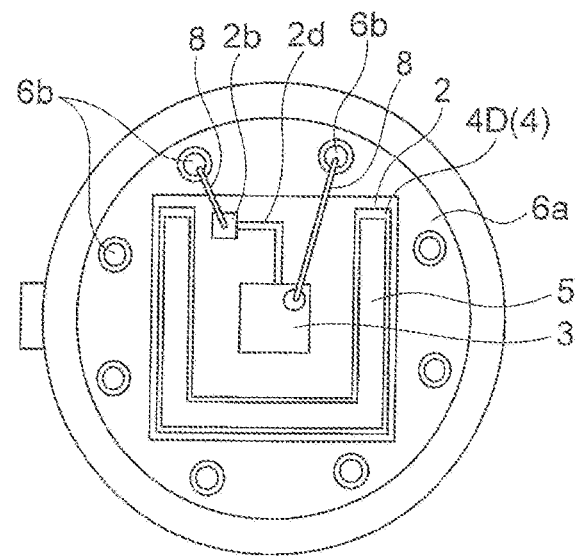
FIG. 10 is a plan view illustrating a modification of the light-detecting device.
Figure 10:
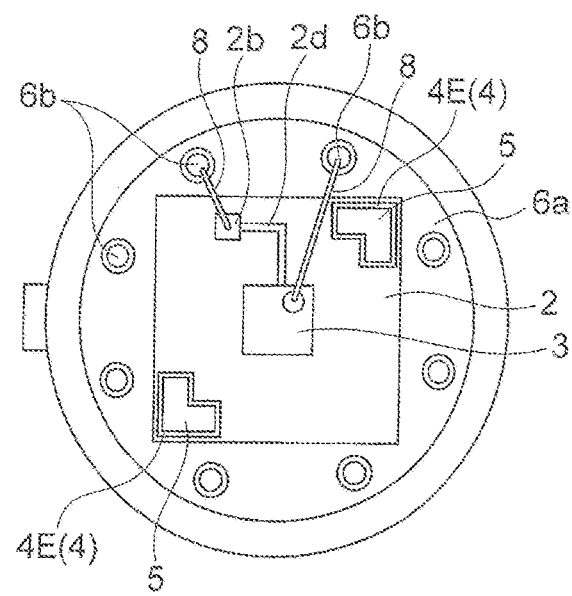

In addition, as illustrated in FIG. 10(A), a spacer 4D of a shape of U is fixed on the wiring substrate 2. In addition, the die bond resin 5 may be applied over almost the entire length of a top surface of the spacer 4D of the shape of U.

In addition, as illustrated in FIG. 10(B), spacers 4E of a shape of L are fixed on two vertexes position at a diagonal line of the wring substrate 2 among the four vertexes of the wiring substrate 2. in addition, the die bond resin 5 may be applied over the top surface of the spacer 4E.

In addition, in the embodiment, as illustrated in FIG. 2, the light transmission region 11 is the region narrower than the opening 50a. However, the present invention is not limited to the above form. When light with a width narrowed previously is introduced as incidence light, as illustrated in FIG. 2, the light transmission region 11 becomes narrower than the opening 50a. However, when light with a width larger than a width of the opening 50a is introduced as the incidence light, the opening 50a defines the light transmission region 11. The present invention can be applied to such a form.

INDUSTRIAL APPLICABILITY

According to the light-detecting device according to one aspect of the present invention, miniaturization is enabled.

REFERENCE SIGNS LIST

1: spectral sensor (light-detecting device), 2: wiring substrate, 2A: principal surface, 2b: electrode pad (bonding pad), 3: light detector, 4, 4A to 4E: spacer (support member), 10: Fabry-Perot interference filter, 11: light transmission region, 12, 13: terminal, (bonding pad), A1: opening, R1: surrounding region of light transmission region 11.

The invention claimed is:

1. A light-detecting device comprising:
a wiring substrate which has a principal surface;
a thermistor which is disposed on the principal surface of the wiring substrate;
a light detector which is disposed on the principal surface of the wiring substrate and is electrically connected to the wiring substrate;
support members which are disposed around the light detector and the thermistor on the principal surface of the wiring substrate; and
a Fabry-Perot interference filter which has a light transmission region and is disposed on the principal surface of the wiring substrate with the support members therebetween, wherein the support members support the Fabry-Perot interference filter in a surrounding region of the light transmission region, the support members is arranged to form a first opening and a second opening disposed so as to sandwich the surrounding region and communicating with an inner side of the surrounding region and an outer side of the surrounding region when viewed from a light transmission direction in the light transmission region, the Fabry-Perot interference filter has a substrate, a first mirror secured to the substrate and a second mirror opposing the first mirror having a gap interposed therebetween and being movable relative to the first mirror, the light detector and the thermistor are disposed in a region sandwiched by the support members on the principal surface of the wiring substrate, the light detector is connected to wiring passing through the first opening, and the thermistor is connected to wiring passing through the second opening.

2. The light-detecting device according to claim 1, wherein the support members are rod-shaped, and the support members are two in number.

3. The light-detecting device according to claim 1, wherein the Fabry-Perot interference filter has bonding pads, and the support members are disposed at positions corresponding to the bonding pads of the Fabry-Perot interference filter when viewed from the light transmission direction.

4. The light-detecting device according to claim 1, wherein the support members are separated from the light transmission region of the Fabry-Perot interference filter when viewed from the light transmission direction.

* * * * *